United States Patent [19]
Spicuzza, Jr.

[11] 3,742,103
[45] June 26, 1973

[54] METHOD FOR PREPARING AND MOLDING EXPANDABLE, NON-EQUIMOLAR STYRENE-MALEIC ACID HALF ESTER COPOLYMER PARTICLES

[75] Inventor: John P. Spicuzza, Jr., Pittsburgh, Pa.

[73] Assignee: Sinclair-Koppers Company, Pittsburgh, Pa.

[22] Filed: Apr. 22, 1971

[21] Appl. No.: 136,538

[52] U.S. Cl. ........... 264/53, 260/2.5 B, 260/78.5 R, 264/126, 264/DIG. 5, 264/DIG. 13
[51] Int. Cl.. B29d 27/00, B29d 27/08, C08f 19/10, C08f 27/12, C08f 47/10
[58] Field of Search ................... 264/51, 53, DIG. 5, 264/DIG. 13, 126; 260/2.5 B, 78.5 R

[56] References Cited
UNITED STATES PATENTS

| | | | |
|---|---|---|---|
| 3,509,110 | 4/1970 | Di Giulio et al. | 260/78.5 R |
| 2,787,809 | 4/1957 | Stastny | 260/2.5 B X |
| 3,342,760 | 9/1967 | Rode et al. | 260/2.5 B |
| 3,370,022 | 2/1968 | Ingram et al. | 260/2.5 B |
| 2,971,939 | 2/1961 | Baer | 260/78.5 R X |
| 3,547,838 | 12/1960 | Moore et al. | 260/78.5 R X |

OTHER PUBLICATIONS
The Condensed Chemical Dictionary, Seventh Edition, completely revised and enlarged by Arthur and Elizabeth Rose, New York, Van Nostrand Reinhold, c1966, p. 27.

Primary Examiner—Philip E. Anderson
Attorney—Hubert E. Evans, Lewis J. Young, Oscar B. Brumback and Olin E. Williams

[57] ABSTRACT

Expandable, non-equimolar styrene-maleic acid half ester copolymer particles are prepared by a process comprising impregnating styrene-maleic anhydride copolymer particles with an alcohol in the presence of a hydrocarbon blowing agent in an aqueous suspension, heating the impregnated particles to allow at least partial esterification of the anhydride groups by the alcohol, cooling the suspension to room temperature, and separating the impregnated, partially esterified copolymer particles from the aqueous suspension.

4 Claims, 1 Drawing Figure

Patented June 26, 1973 3,742,103
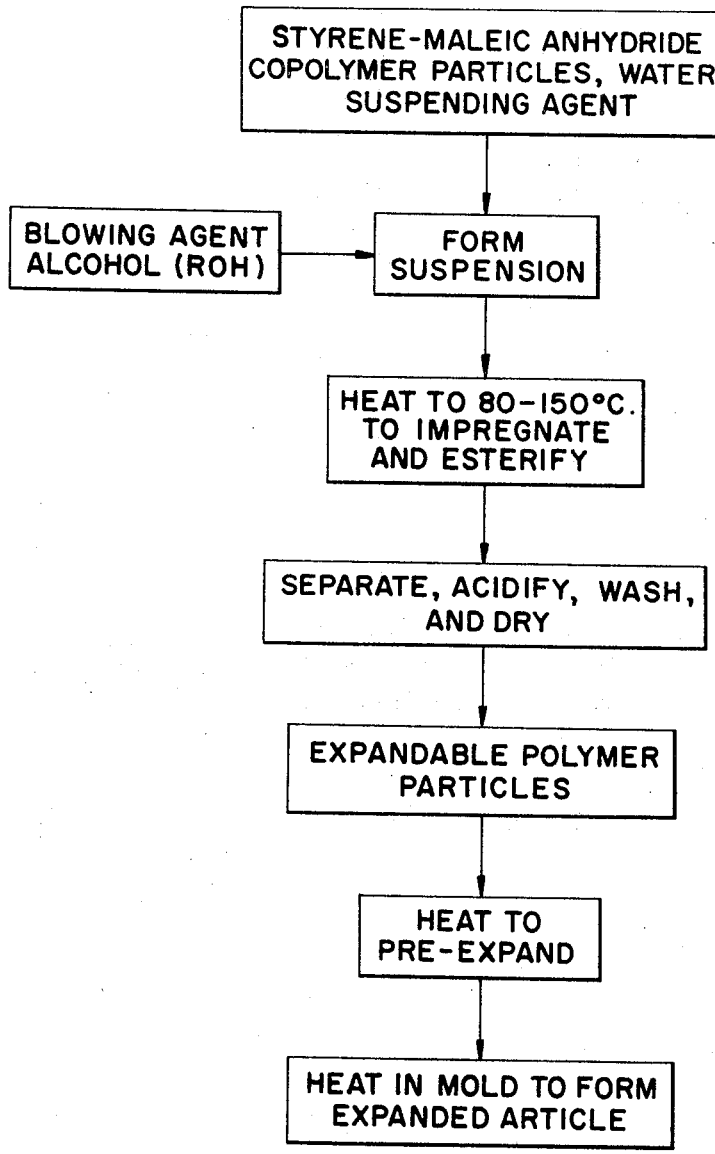

METHOD FOR PREPARING AND MOLDING EXPANDABLE, NON-EQUIMOLAR STYRENE-MALEIC ACID HALF ESTER COPOLYMER PARTICLES

BACKGROUND OF THE INVENTION

Generally speaking, there are two major types of styrene polymer foams used in the United States — foam produced by extrusion of a mixture of polymer, nucleating agents, and a volatile liquid blowing agent and foam produced by molding expandable polymer beads. The molding of foams normally involves a two-step expansion process. First, the particles containing a blowing agent are expanded in a continuous flow of steam to yield free-flowing foam particles of the desired density. After an aging period of several hours during which air diffuses into the expanded particles, they are placed in a slightly vented mold, and heated by steam injected into the mold cavity so that they expand to fill the interstices and fuse together. The molding operation is completed by circulating cold water in the jacket of the mold until the foam no longer exerts pressure.

Copolymers of styrene and minor amounts of maleic anhydride have a higher heat deflection temperature than does polystyrene — the heat deflection temperature increasing with increasing maleic anhydride content of the copolymer. This enhanced thermal property is a very useful and desirable property for thermoplastic polymers to be used in commercial applications. For certain high-temperature applications, foams made from this heat-resistant copolymer would be highly useful.

The production of foam from the styrene-maleic anhydride copolymers by the extrusion of the copolymer in the presence of a blowing agent is known, for example in U. S. Pat. No. 3,547,838 and British Pat. No. 1,140,146.

However, the foaming of the styrene-maleic anhydride copolymers by the molding of expandable beads has not been successful. The copolymers of styrene and maleic anhydride may be impregnated with blowing agents by the usual methods applicable to polystyrene; for example, U. S. Pat. Nos. 2,983,692 or 2,950,261. However, attempts to mold the partially expanded copolymer particles by the usual methods of subjecting to heat at a fusion temperature in a mold, either with or without a vacuum, have failed due to sudden collapse of the foam structure. Apparently, the copolymer particles retain the blowing agent during the expansion step at about 212°–230°F., but lose the blowing agent too rapidly during the molding step at 265°–295°F. Apparently, the intermolecular adhesive forces present in the foam made from the anhydride copolymer disintegrated and allow the sudden loss of substantially all the blowing agent from the foam cells instead of the normal slow loss of gas which accompanies the post-heating of moldable expanded particles in a confined space.

SUMMARY OF THE INVENTION

It has now been found that expandable particles of non-equimolar copolymers of styrene and a minor amount of maleic anhydride can be prepared by adding an alcohol to particles of the copolymer during impregnation with a blowing agent, whereby at least a partial esterification of the anhydride groups is effected. The resulting expandable particles can be processed in equipment normally used for expandable polystyrene to form structures having low density, good foam fusion, and a resistance to heat only slightly less than that of the parent styrene-maleic anhydride co-polymer.

BRIEF DESCRIPTION OF THE DRAWING

The drawing is a flow diagram of the process.

DETAILED DESCRIPTION OF THE INVENTION

The non-equimolar copolymers of styrene and minor amounts of maleic anhydride useful in this invention can be prepared by a number of known methods. Thus, U. S. Pat. No. 2,971,939 describes a method for preparing the copolymer by solution polymerization of the monomers utilizing an incremental addition technique whereby the reactive monomer is continuously added during the progress of the polymerization. U. S. Pat. Nos. 2,769,804 and 2,989,517 describe a continuous recycle polymerization process for making non-equimolar copolymers. U. S. Pat. No. 3,509,110 describes a suspension polymerization wherein styrene is copolymerized with an alkyl hydrogen maleate followed by cyclization of the maleic half ester portion of the copolymer to the anhydride.

The anhydride content of the copolymers useful in this invention may be between 3 and 25 percent by weight, preferably between 5 and 18 percent by weight. The copolymers may be used in the form of granules, pellets, particulate pieces or even comminuted sheets of such copolymer. Preferably, the copolymers are in the form of beads, which are advantageously prepared by suspension copolymerization.

The blowing agents are compounds which are gases or are normally liquid, but will produce gases on heating to a temperature below the softening point of the copolymer. Preferred blowing agents include aliphatic or cycloaliphatic hydrocarbons containing from one to seven carbon atoms in the molecule such as petroleum ether, methane, ethane, propane, butane, pentane, hexane, heptane, cyclohexane, isopentane and the halogenated derivatives of these. The agents are normally used in amounts between 3 and 15 percent of the total weight of the copolymer.

The particles of copolymer are suspended in an aqueous medium by means of a suitable suspending agent system to keep the particles from agglomerating at the elevated temperatures employed during the impregnation and esterification steps. Suitable systems use, for example, those inorganic suspending agents described in D'Alelio, U. S. Pat. No. 2,983,692, such as tricalcium phosphate or organic suspending agents, such as that described in Buchholz et al., U. S. Pat. No. 2,950,261.

The alcohols useful in the present invention are those having the general formula ROH, wherein R may be alkyl having one to five carbon atoms, such as methyl, ethyl, propyl, isopropyl, allyl, butyl, neopentyl, and their halogenated derivatives, phenyl and alkyl substituted phenyl and their halogenated derivatives such as p-bromophenyl and 2,4,6-tribromophenyl, and mixtures of these alcohols. The alcohols are added in amounts between 1 and 25 percent by weight of the copolymer. The preferred amount of the alcohol, or mixture of alcohols, will be equal to or slightly greater than the stoichiometric amount required to react with the anhydride groups of the copolymer to form the half ester.

The alcohol is carried into the polymer particle during the impregnation of the particle with the blowing agent. The impregnation is conventionally carried out at a temperature ranging from about 80° to 150°C., preferably from 90° to 120°C. Increasing the temperature makes the impregnation proceed at a faster rate. The time of the impregnation may be varied from 3 to 25 hours. During this time, the alcohol reacts with the maleic anhydride portion of the copolymer to form the half ester. The longer times serve to allow the blowing agent and the alcohol to penetrate more thoroughly into the polymer particles and the alcohol and anhydride to react in the esterification reaction.

The impregnated and esterified copolymer particles are then cooled to room temperature, separated from the aqueous suspension, treated to remove residual suspending agent, rinsed with water, and dried.

The particles of copolymer thus impregnated may be molded by the usual pre-expansion and molding techniques in conventional apparatus. By contrast, the styrene-maleic anhydride copolymer, when impregnated but not esterified, cannot be molded under normal processing conditions.

The process is schematically illustrated by the flow diagram in the drawing.

The following examples are illustrative of the present invention. Parts and percentages are by weight unless otherwise specified.

EXAMPLE I

To a 12-ounce bottle were added 100 grams of water, 3.0 grams of tricalcium phosphate, 5.0 grams of sodium chloride, 100 grams of cylindrical pellets (1/16 inch diameter × ¼ inch length) of non-equimolar copolymer of styrene and maleic anhydride containing 90 percent styrene and 10 percent maleic anhydride and 20 grams of methanol. The mixture was stirred, and 9.0 parts of a 50–50 mixture of isopentane and n-pentane was added and the bottle was sealed. With end-over-end agitation in an oil bath, the bottle was heated to 115°C over a period of 1.5 hours and maintained at 115°C for an additional 12 hours. The mixture was then cooled, acidified with hydrochloric acid, and the particles separated from the water by centrifugation. They were then washed with water and dried overnight on the bench top. The cylindrical particles become "rounded off" as a result of the above process and resembled roughly spherical beads. Infrared analysis of the product indicated a 93 percent conversion of the anhydride groups of the copolymer to the methyl half ester. After heating for 2 hours at 150°C. the particles lost 11.5 percent by weight. In steam at atmospheric pressure for 5 minutes, foam particles with a bulk density of 2.1 pounds per cubic foot were obtained. In steam of 5 psig. pressure for one minute, the particles expanded to a bulk density of 1.0 pounds per cubic foot. On the next day following expansion, the latter foam particles were overcharged to a 5 inch by 5 inch by ½ inch cavity, dampened by a spray of water, pressed between platens heated to 290°F. for 2 minutes, and cooled by circulating water in the platens. The foam had the exact dimensions of the mold, and was fused to an extent of 20–25 percent. Similar particles were also molded in the form of a 2 inch thick by 8 inch diameter cylinder by the familiar expandable polystyrene steam-molding system (see Technical Manual C-9-273, Dylite Expandable Polystyrene, Chapter 3e, "Mold Techniques and Mold Design," 1959, Sinclair-Koppers Co., Pittsburgh, Pennsylvania, 15219). Well-fused (60–65 percent), dimensionally stable moldings were obtained by exposing the foam particles to steam of 40 psig. until an internal pressure of 25 psig. was exerted. Aged specimens of this foam were found to retain their dimensions in an air-circulating oven at temperatures below 225°–230°F. Similarly molded polystyrene foams did not have this heat-resistance and only retained their dimensions at temperatures below 175°–195°F.

Pellets treated by the identical impregnation process except omitting the methanol, could not be molded between platens at 290°F. due to collapse, rather than post-expansion, of the expanded particles in the mold.

EXAMPLE II

To illustrate the range of alcohols useful in the present invention, the esterification-impregnation process described in Example I was repeated several times replacing the methanol with the specified amounts of various alcohols shown in Table I. The product beads were expanded in steam for 5 minutes at atmospheric pressure and the resulting bulk density of the foam determined. The foam particles were then molded into 5 inch by 5 inch by 0.5 inch specimens for 2 minutes at the temperature shown in the table. The bulk densities and the foam molding temperatures are tabulated in Table I.

TABLE I

| Run No. | Alcohol | % (Pellet Basis) | Expandability: 5-Minute Expansion in Steam at Atmospheric Pressure; Bulk Density (pcf) | Molding Temp. (°F)[a] |
|---|---|---|---|---|
| 1 | None | | 4.9 | No suitable temp.[b] |
| 2 | Methanol | 20.0 | 2.1 | 290 |
| 3 | Ethanol | 5.0 | 2.2 | 290 |
| 4 | Propanol | 5.0 | 1.5 | 290 |
| 5 | Isopropanol | 5.0 | 2.0 | 275 |
| 6 | Allyl Alcohol | 5.0 | 1.7 | 290 |
| 7 | 2,3-Dibromopropanol | 10.0 | 2.8 | 290 |
| 8 | Methanol 2,3-Dibromopropanol | 10.0 10.0 | 2.3 | 290 |
| 9 | 2,3-Dichloropropanol | 5.0 | 1.0 | 275 |
| 10 | Methanol 2,3-dichloropropanol | 10.0 5.0 | 0.9 | 275 |
| 11 | Phenol | 1.0 | 1.8 | 280 |
| 12 | Phenol | 3.0 | 1.1 | 280 |
| 13 | Phenol Methanol | 3.0 10.0 | 0.8 | 280 |
| 14 | Methanol p-Bromophenol | 10.0 1.0 | 0.8 | 280 |
| 15 | Methanol 2,4,6-Tribromophenol | 10.0 3.0 | 0.8 | 280 |

Note a) The platens were preheated to the indicated temperature, the mold was overcharged with particles of the indicated bulk density, the foam was sprayed with water, the mold was closed for two minutes, and then the platens were cooled to room temperature. At the indicated mold temperature, the foams were dimensionally stable and exhibited at least 10% fusion. Substantially lower or higher temperatures gave unfused or shriveled (yet fused) moldings, respectively.

Note b) The compressed and heated particles either fell out of the mold (at lower temperatures) or crumbled apart (at intermediate temperatures) or collapsed (at higher temperatures) with essentially no particle-to-particle fusion.

Other alcohols shown to form moldable compositions with the styrene-maleic anhydride copolymer were 2-bromoethanol, 1,3-dibromo-2,2-bis(hydroxymethyl)-propane, 2,2-bis(bromomethyl)-3-bromopropanol, 1,3-dichloro-2-propanol, α,β-dibromodihydrocinnamyl alcohol, p-bromophenol, and 2,4,6-tribromophenol. It should be noted that without alcohol, the impregnated copolymer in Run No. 1 could not be molded even in excess of 290°F. All of the runs using alcohols could be molded at temperatures ranging from 275° to 290°F.

EXAMPLE III

To illustrate the effect of using different blowing agents in the present invention, the esterification-impregnation process described in Example I was repeated replacing the 9.0 parts of a 50–50 mixture of iso-pentane and n-pentane with 9.0 parts of the agents indicated in the Table II. The product beads were expanded in steam for 5 minutes at atmospheric pressure and the resulting bulk density of the foam determined and tabulated in Table II.

TABLE II

| Run No. | Blowing Agent | Expandability: 5 Minute Expansion In Steam at Atmospheric Pressure; Bulk Density (pcf) |
|---|---|---|
| 1 | n-pentane | 2.1 |
| 2 | isopentane | 2.4 |
| 3 | iso/n-pentane(50/50) | 2.1 |
| 4 | petroleum ether | 1.6 |
| 5 | cyclopentane | 1.1 |

All of the runs could be molded at 290°F. to form dimensionally stable foams having at least 10 percent fusion of the particles.

What is claimed is:

1. A process for preparing expandable particles from non-equimolar copolymers of styrene and a minor amount of maleic anhydride comprising:
   a. forming an aqueous suspension of particles of a non-equimolar copolymer of styrene and a minor amount of maleic anhydride, said suspension being stabilized by a suitable suspending agent system;
   b. adding to the suspension a mixture of an aliphatic or cycloaliphatic hydrocarbon blowing agent containing from one to seven carbon atoms in the molecule and an alcohol having the general formula ROH, wherein R may be alkyl having one to five carbon atoms, halogenated alkyl having one to five carbon atoms, phenyl, alkyl-substituted phenyl, halogenated phenyl, and mixtures thereof; said alcohol being present in an amount equal to or slightly greater than the stoichiometric amount required to react with the anhydride groups of the copolymers to form a half-ester;
   c. maintaining said hydrocarbon and said alcohol in contact with the suspension at a temperature of between 80° and 150° C. until the hydrocarbon and the alcohol are integrated within said copolymer particles; and
   d. separating said particles from said aqueous suspension.

2. The process of claim 1 wherein said alcohol is used in amounts between 1 and 25 percent by weight based on the copolymer particles.

3. The process of claim 1 wherein said hydrocarbon blowing agent is used in amounts between 3 and 15 percent by weight based on the copolymer particles.

4. A process for making foamed structures comprising:
   a. forming an aqueous suspension of particles of a non-equimolar copolymer of styrene and a minor amount of maleic anhydride, said suspension being stabilized by a suitable suspending agent system;
   b. adding to the suspension a mixture of an aliphatic or cycloaliphatic hydrocarbon blowing agent containing from one to seven carbon atoms in the molecule and an alcohol having the general formula ROH, wherein R may be alkyl having one to five carbon atoms, halogenated alkyl having one to five carbon atoms, phenyl, alkyl-substituted phenyl, halogenated phenyl, and mixtures thereof; said alcohol being present in an amount equal to or slightly greater than the stoichiometric amount required to react with the anhydride groups of the copolymers to form a half-ester;
   c. maintaining said hydrocarbon and said alcohol in contact with the suspension at a temperature of between 80° and 150° C. until the hydrocarbon and the alcohol are integrated within said copolymer particles;
   d. separating said particles from said aqueous suspension;
   e. partially expanding said particles in the presence of heat;
   f. subjecting said partially expanded particles to temperatures between 275° and 290° F. in a closed mold, whereby dimensionally stable, well-fused foamed structures of styrene-maleic half-ester copolymer are produced.

* * * * *